3,375,195

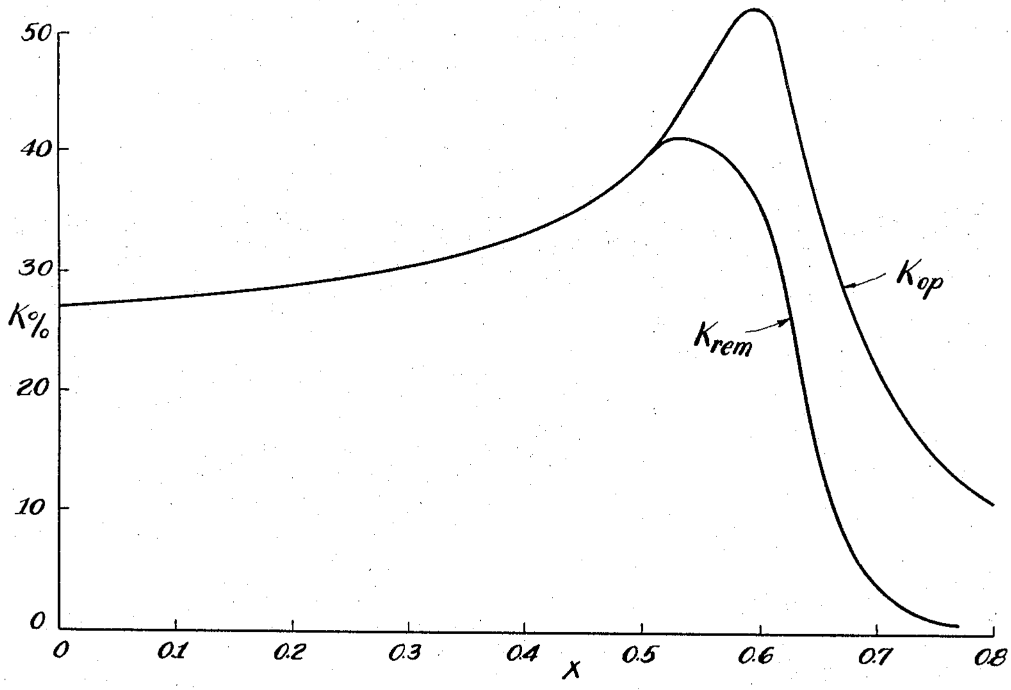
INVENTORS.
FRANK G. BROCKMAN
PAUL W. BECK
WALTER G. STENECK
Frank R. Jinfai
AGENT.

ELECTROMECHANICAL TRANSDUCER EMPLOYING PIEZOMAGNETIC MANGANESE FERROUS FERRITE

Frank G. Brockman, Dobbs Ferry, Paul W. Beck, Irvington, and Walter G. Steneck, Ossining, N.Y., assignors to North American Philips Company, Inc., New York, N.Y., a corporation of Delaware Continuation of application Ser. No. 312,687, Sept. 30, 1963. This application Nov. 14, 1966, Ser. No. 594,255
1 Claim. (Cl. 252—62.56)

ABSTRACT OF THE DISCLOSURE

A manganese-ferrous ferrite core suitable for use in an electromechanical transducer. The core has a coupling coefficient of 30% or more. The core is prepared by mixing manganese and ferric oxides in proportions corresponding to the composition of the core, followed by prefiring the mixture, molding cores, and sintering and cooling in atmospheres in which the ratio of carbon dioxide to carbon monoxide is adjusted to result in the formation of an amount of ferrous oxide corresponding to the amount of ferrous iron in the composition.

This is a continuation of application Ser. No. 312,687, filed Sept. 30, 1963, now abandoned.

Our invention relates to ferromagnetic materials and more particularly to those having piezomagnetic properties, and methods of making the same.

Such materials are useful in vibrators for converting electrical energy into mechanical energy, for example ultrasonic vibrations, and conversely for converting mechanical energy to electrical energy (see for example, "Philips Technical Review," 18, 258–298, 1956/57). It is desirable for such purposes that the material have a large electromechanical coupling coefficient which is a measure of the conversion of magnetic energy into mechanical energy (or vice versa). Known ferromagnetic materials having piezomagnetic properties, viz nickel-cobalt ferrites, generally exhibit a coupling coefficient in the neighborhood of 20%.

A principal object of our invention is to provide a new and novel material having piezomagnetic properties which has a large electromechanical coupling coefficient and is thus more efficient in converting electrical to mechanical energy and vice versa.

Another object of our invention is to provide a method of making a piezomagnetic material having a large electromechanical coupling coefficient.

A further object of our invention is to provide a new and novel material having piezomagnetic properties which has a coupling cefficient exceeding 30%.

These and further objects of the invention will appear as the specification progresses.

In accordance with our invention, this new and novel ferromagnetic material, which exhibits piezomagnetic properties with a large electromechanical coupling coefficient, is a manganese ferrous ferrite having a composition:

$$Mn_xFe^{II}_{(1-x)}Fe_2^{III}O_4$$

For coupling coefficients of 30% or more, $x$=0.28 to 0.67.

It has been generally considered that manganese ferrites of high permeability are practically devoid of magnetostrictive effects. It was widely considered that the high permeability was the result of a near zero in magnetostriction brought about by the cancellation of negative magnetostriction of manganese ferrites by the appropriate amount of ferrous ferrite of positive magnetostriction. (See, for example, Ferrites" by J. Smit and H. P. J. Wijn, 1959, p. 171.) One would therefore expect that high permeability mixed manganese ferrites, e.g. manganese-ferrous ferrite, would be devoid of piezomagnetic effects, and in particular would have a small electromechanical coupling coefficient. However, we have found quite unexpectedly that manganese ferrous ferrites of the type $$Mn_xFe^{II}_{(1-x)}Fe_2^{III}O_4$$

do have piezomagnetic properties and that for a range of compositions in which $x$ has a value between 0.28 and 0.67, the coupling coefficient is at least 30%.

The invention will be described with reference to the accompanying drawing, the sole figure of which shows the electromechanical coefficients of the system $$Mn_xFe^{II}_{(1-x)}Fe_2^{III}O_4$$

The efficiency of a ferromagnetic transducer converting magnetic energy to mechanical energy, and vice versa, is determined by its electromechanical coupling coefficient $k$, which is a quantity related to the stored mechanical and magnetic energies. It is defined as the square root of the ratio of the converted stored energy to the input stored energy for the case of no losses or radiation. For maximum conversion of energy, and vice versa, this coefficient should be as large as possible, i.e. approach unity, or 100%.

The coupling coefficient $k$ has a maximum value as a function of bias field at any one temperature. This maximum in $k$, however, may be observed under two different conditions: (1) in the case when the sample is initially demagnetized and $k$ is observed with values of the bias field increasing from zero, and (2) in the case when the sample is in the remanent state and $k$ is observed with values of the bias field increasing from zero. In case (1), $k$ begins at zero for $H_{bias}=0$. In case (2), $k$ begins at $k_{rem}$ from $H_{bias}=0$ and has a maximum value $k_{op}$.

Referring then to the drawing, the values of $k_{rem}$ and $k_{op}$ are plotted as ordinates and values of $x$ in the composition $Mn_xFe^{II}_{(1-x)}Fe_2^{III}O_4$ as abscissae. It will be seen that the coupling coefficient $k_{op}$ exceeds 30% over the range $x$=0.28 to 0.67. Beyond a value of $x$=0.7, the coupling coefficient $k$ drops rather abruptly so that the range of interest appears to coincide with a coupling coefficient of at least 30%.

The following examples are illustrative of the method of manufacture of manganese ferrous ferrites according to the invention:

*Example 1*

$$Mn_{0.4}Fe_{0.6}Fe_2O_4$$

The following reactants were weighed out:

| | Grams |
|---|---|
| Iron oxide ($Fe_2O_3$), 100.0% $Fe_2O_3$ | 166.09 |
| Manganese oxide ($Mn_2O_3$), 99.88% $Mn_2O_3$ | 25.29 |

These oxides were thoroughly mixed with 300 cc. ethanol in a high speed blender for 30 minutes. The slurry was dried under infrared lamps; the cake resulting was broken up and drying was completed at 120° C. for about 1 or 2 hours. The dry material was broken up in a mortar and pestle and passed through a sieve, U.S. Standard Sieve No. 30. This sieved powder was loaded into an Alundum boat and the boat and load were placed in an atmosphere furnace for prefiring.

Beginning at room temperature, the atmosphere in the furnace was $CO_2/CO$: 10/1 by volume. This ratio $CO_2/CO$ was maintained up to a temperature of about 600° C. From 600° C. to 800° C. the ratio was changed at 100° C. intervals as follows:

| Degrees C.: | |
|---|---|
| 600 to 700, $CO_2/CO$ | 14/1 |
| 700 to 800, $CO_2/CO$ | 18/1 |
| 800, $CO_2/CO$ | 24/1 |

The powder was maintained for about 15 hours at 800° C. under the 24/1 atmosphere.

In cooling, the $CO_2/CO$ ratio was controlled in the same way as with rising temperature,

| Degrees C.: | |
|---|---|
| 800 to 700, $CO_2/CO$ | 18/1 |
| 700 to 600, $CO_2/CO$ | 14/1 |
| 600 to room temperature, $CO_2/CO$ | 10/1 |

This prefired powder was ball milled in a steel mill with steel balls using ethanol as the milling fluid. Milling time, 6 hours.

The slurry from the mill was dried under infrared lamps, was broken up, and drying was completed at 120° C. for about 1 or 2 hours.

After this the powder was broken up and test toroids were pressed in a conventional manner.

These toroids were fired under controlled atmosphere as follows; from room temperature to 600° C. the atmosphere was $CO_2/CO$ 10/1.

| Degrees C.: | |
|---|---|
| 600 to 700, $CO_2/CO$ | 14/1 |
| 700 to 800, $CO_2/CO$ | 18/1 |
| 800 to 900, $CO_2/CO$ | 24/1 |
| 900 to 1000, $CO_2/CO$ | 32/1 |
| 1000 to 1100, $CO_2/CO$ | 42/1 |
| 1100 to 1200, $CO_2/CO$ | 56/1 |
| 1200 to 1250, $CO_2/CO$ | 75/1 |

Test toroids were maintained at 1250° C. for 2 hours under the 75/1 $CO_2/CO$ atmosphere. Cooling followed the same program as the heating.

The test rings were about O.D. 2.8 cm., I.D. 2.0 cm., height 0.67 cm. These resonated in the radial mode at about 70 kc./sec. The electromechanical coupling coefficient was measured by the resonance method and was found to be 32.7% at the optimum bias field of zero oersted (i.e. at remanence).

*Example 2*

$Mn_{0.5}Fe_{0.5}Fe_2O_4$

The following reactants were weighed out:

| | Grams |
|---|---|
| Iron oxide ($Fe_2O_3$), 100.0% $Fe_2O_3$ | 159.70 |
| Manganese oxide ($Mn_2O_3$), 99.88% $Mn_2O_3$ | 31.61 |

The procedure was the same as in Example 1 up to the prefiring. Prefiring of the powder was carried out as follows:

Beginning at room temperature the atmosphere in the furnace was $CO_2/CO$ 11/1 by volume. This ratio of $CO_2/CO$ was maintained up to a temperature of about 600° C. From 600° C. to 700° C. the ratio $CO_2/CO$ was 15/1. At 700° C. the ratio was changed to 20/1. The powder was kept at 700° C. under $CO_2/CO$: 20/1 for 22 hours. In cooling the $CO_2/CO$ ratio was changed in the same way as with rising temperature.

The prefired powder was prepared in the same manner as in Example 1 and test toroids were pressed and fired.

The firing cycle was as follows:

From room temperature to 600° C., $CO_2/CO$ 11/1 and from:

| Degrees C.: | |
|---|---|
| 600 to 700, $CO_2/CO$ | 15/1 |
| 700 to 800, $CO_2/CO$ | 20/1 |
| 800 to 900, $CO_2/CO$ | 27/1 |
| 900 to 1000, $CO_2/CO$ | 36/1 |
| 1000 to 1100, $CO_2/CO$ | 46/1 |
| 1100 to 1200, $CO_2/CO$ | 61/1 |
| 1200 to 1250, $CO_2/CO$ | 81/1 |

The toroids were maintained for two hours at 1250° C. under the 81/1 $CO_2/CO$ atmosphere. Cooling followed the same program as the heating.

The test rings were about the same size as those in Example 1. They resonated in the radial mode at about 70 kc./sec. The electromechanical coupling coefficient was measured by the resonance method and was found to be 39.1% at the optimum bias field of zero (oersted) (i.e. at remanence).

*Example 3*

$Mn_{0.6}Fe_{0.4}Fe_2O_4$

The following reactants were weighed out:

| | Grams |
|---|---|
| Iron oxide ($Fe_2O_3$), 100.0% $Fe_2O_3$ | 153.31 |
| Manganese oxide ($Mn_2O_3$), 99.81% $Mn_2O_3$ | 37.94 |

The procedure was the same as in Example 1 up to the prefiring. Prefiring of the powder was carried out as follows:

Beginning at room temperature, the atmosphere in the furnace was $CO_2/CO$ 13/1 by volume.

This ratio was maintained up to a temperature of about 600° C. From 600° C. to 700° C. the ratio was 17/1. At 700° C. the ratio was changed to 23/1. The powder was kept at 700° C. under $CO_2/CO$ 23/1 for 22 hours. In cooling, the $CO_2/CO$ ratio was changed in the same way as with rising temperature.

The prefired powder was prepared in the same manner as in Example 1 and test toroids were pressed and fired.

The firing cycle was as follows.

From room temperature to 600° C., $CO_2/CO$ 13/1 and from:

| | |
|---|---|
| 600° to 700° C., $CO_2/CO$ | 17/1 |
| 700° to 800° C., $CO_2/CO$ | 23/1 |
| 800° to 900° C., $CO_2/CO$ | 30/1 |
| 900° to 1000° C., $CO_2/CO$ | 40/1 |
| 1000° to 1100° C., $CO_2/CO$ | 50/1 |
| 1100° to 1200° C., $CO_2/CO$ | 67/1 |
| 1200° to 1250° C., $CO_2/CO$ | 88/1 |

The toroids were maintained for two hours at 1250° C. under the 88/1 $CO_2/CO$ atmosphere. Cooling followed the same program as the heating.

The test rings were about the same size as those in Example 1. They resonated in the radial mode at about 68 kc./sec. The electromechanical coupling coefficient was measured by the resonance method and was found to be 52.2% at the optimum bias field of 3.7 oersteds.

In describing the invention, we have given specific programs for the firing atmospheres with respect to the temperatures. While a non-oxidizing atmosphere is required, we do not wish to be restricted to the atmospheres given in the examples. In order to illustrate this, we give an additional example. In this example the composition was the same as given in Example 3, but the firing atmosphere was more oxidizing.

*Example 4*

$Mn_{0.6}Fe_{0.4}Fe_2O_4$

The preparation of the materials for this example was essentially the same as that of Example 3 up to the final firing of the test toroids.

In this example, the test rings were fired from room temperature to 1300° C. under an atmosphere, at all times, of pure $CO_2$ and cooled also under the same atmosphere.

The test ring was about O.D. 2.8 cm., I.D. 2.0 cm., height 1.3 cm. It resonated in the radial mode at about 70 kc./sec. The electromechanical coupling coefficient was measured by the resonance method and was found to be 42.0% at the optimum bias field of 7.5 oersteds.

While we have carried out the firing in the examples in atmospheres of $CO_2$ and CO, this atmosphere is not required since it has been found that it is only essential to the preparation of such ferrites that the partial pressure of oxygen in the atmosphere employed during the final firing should lie between $10^{-9}$ and $10^{-3}$ atmosphere. Thus, atmospheres of technical nitrogen, or noble gases containing oxygen at a partial pressure of $10^{-9}$ to $10^{-3}$ atmosphere may be employed.

Therefore, while we have described our invention in connection with specific examples and applications thereof, other modifications will be readily apparent to those skilled in this art without departing from the spirit and scope of the invention which is defined in the appended claim.

What is claimed is:

1. In a vibrator for converting electrical energy into mechanical energy and vice versa, a core having a coupling coefficient of at least 30% and consisting essentially of a composition:

$$Mn_xFe^{II}{}_{(1-x)}Fe_2{}^{III}O_4$$

$x$ having a value between 0.28 and 0.67.

References Cited

UNITED STATES PATENTS

| | | | |
|---|---|---|---|
| 2,636,860 | 4/1953 | Snoek et al. | 252—62.5 |
| 3,027,327 | 3/1962 | Blank | 252—62.5 |
| 3,047,429 | 7/1962 | Stoller et al. | 252—62.5 |

OTHER REFERENCES

Brailsford: Magnetic Materials, 1960, p. 169.
Smit and Wijn: Ferrites, 1959, pp.254–5.

TOBIAS E. LEVOW, *Primary Examiner.*

R. D. EDMONDS, *Examiner.*